United States Patent [19]

Totsch

[11] Patent Number: 4,805,761
[45] Date of Patent: Feb. 21, 1989

[54] MAGNETIC CONVEYOR SYSTEM FOR TRANSPORTING WAFERS

[76] Inventor: John W. Totsch, R.R. 1 Box 1484A, Sheldon, Vt. 05483

[21] Appl. No.: 72,896

[22] Filed: Jul. 14, 1987

[51] Int. Cl.[4] ............................................. B05G 35/00
[52] U.S. Cl. ..................................... 198/619; 198/811; 198/690.1; 104/283; 104/286; 104/156
[58] Field of Search ...................... 198/619, 690.1, 811; 104/281, 282, 283, 256, 155, 156

[56] References Cited

U.S. PATENT DOCUMENTS

| | | | |
|---|---|---|---|
| 381,907 | 5/1888 | Connolly et al. | 104/156 |
| 516,188 | 7/1889 | Dewey | 191/10 |
| 1,071,847 | 9/1913 | Wilson . | |
| 1,719,231 | 7/1929 | McLaren . | |
| 2,609,915 | 9/1952 | DeBurgh . | |
| 3,882,791 | 5/1975 | Youngscap . | |
| 3,885,504 | 5/1975 | Baermann | 104/283 |
| 3,899,979 | 8/1975 | Godsey, Jr. | 104/283 |
| 3,951,074 | 4/1976 | Cooper . | |
| 3,954,064 | 5/1976 | Minovitch | 104/283 X |
| 4,108,077 | 8/1978 | Laing . | |
| 4,140,063 | 2/1979 | Nakamura | 104/286 X |
| 4,273,054 | 6/1981 | Yamashita et al. | 104/281 |
| 4,392,435 | 7/1983 | Moody et al. . | |
| 4,457,423 | 7/1984 | Stoll . | |
| 4,534,695 | 8/1985 | Stump et al. . | |
| 4,540,326 | 9/1985 | Southworth et al. . | |
| 4,589,541 | 5/1986 | Lisec | 198/619 X |
| 4,619,573 | 10/1986 | Rathmann et al. . | |
| 4,624,617 | 11/1986 | Belna . | |
| 4,645,182 | 2/1987 | Stoll . | |

FOREIGN PATENT DOCUMENTS

| | | | |
|---|---|---|---|
| 2115267 | 10/1972 | Fed. Rep. of Germany | 104/283 |
| 0048520 | 3/1982 | Japan | 198/619 |
| 0052149 | 3/1982 | Japan | 198/619 |
| 0113760 | 6/1985 | Japan | 198/619 |
| 0018305 | 1/1986 | Japan | 104/283 |
| 0154402 | 7/1986 | Japan | 104/283 |
| 6867045 | 5/1961 | United Kingdom | 104/283 |

OTHER PUBLICATIONS

Engineering Materials & Design (GB), vol. 22, No. 2.

*Primary Examiner*—Robert J. Spar
*Assistant Examiner*—D. Glenn Dayoan
*Attorney, Agent, or Firm*—Harness, Dickey & Pierce

[57] ABSTRACT

A conveyor system for transporting wafers to and from different work stations in a clean-controlled environment includes a platform being magnetically levitated above a U-shaped rail by a magnetic cushion provided by first magnets on the platform and the rail, the first magnets having their magnetic poles arranged to repel one another. A nonmagnetic tube within which is a free-sliding magnetic piston of the same polarity as the first magnets extends along the center of the track. A second magnet is disposed on the platform such that its polarity will repel (or attract) the piston magnet such that as the pressure differential in the tube is changed the piston magnet slidably moves within the tube and pushes (or draws) the platform along the track with it.

2 Claims, 1 Drawing Sheet

MAGNETIC CONVEYOR SYSTEM FOR TRANSPORTING WAFERS

This invention relates to a magnetic conveyor system for transporting integrated circuit wafers to and from different work stations in a clean-controlled environment. This invention also has application to the transportation of various types of lightweight products, such as electrical components and pharmaceuticals.

Semiconductor manufacturers have relied heavily on "human interfacing" in a clean-room to manufacture integrated circuit wafers. Previously the wafers utilized ten micron or greater circuits geometries which were not as sensitive to particle contamination emitted from clean-room personnel or the ambient environment. The sensitivity of a wafer to particle contamination increases almost exponentially with the decrease in circuit geometry and the human is a source of great contamination. Semiconductor producers experience lower yields and increased costs because the same particle count that would be acceptable with ten micron geometries of yesterday are catastrophic to two micron geometries of today. Accordingly, it would be desirable to have a system which automates the transfer of semiconductor wafers with a minimum of human involvement in the process.

Two approaches to automated transport are known: a fixed track extending between work stations or a more flexible robot-on-wheels. In the robot approach sufficient consideration must be given to a floor space and requisite aisles to allow the robots to move. On the other hand the advantages of a track system are that in function, appearance and effect only minimum floor space is needed and the tracks can be suspended overhead and directed through "dirty" facility areas. Accordingly, it would be desirable to have a conveyor system for transporting extremely delicate semiconductor components in a clean-room type enviornment from work stations without unnecessarily introducing contamination which would adversely affect the yield of the semiconductor production.

In accord with this invention, a conveyor system for transporting integrated circuit wafers to and from different work stations in a clean controlled environment includes a magnetic arrangement for magnetically repulsing (i.e., levitating) a platform above a rail conformation having within a pneumatic tube mechanically center mounted on the bottom surface of the rail configuration utilizing a slidable piston within a specific magnetic polarity to transfer the platform along the rail configuration. The rail, tube, and platform are comprised of a nonmagnetic material. The magnetic arrangement includes a magnet defining a piston being slidably disposed in the tube, a magnet extending along each side of the platform, and two pairs of magnets one pair extending along each side of the rail, each of these magnets being arranged such that their polarity will create a magnetic field which will repel one another whereby to form a cushion to "levitate" the platform from the rail. A magnet is also mounted on the platform such that its magnetic polarity is either the same as that of the other magnets whereby to repulse the piston magnet or opposite to that of the other magnets whereby to be attracted to the piston magnet in the tube.

A drive arrangement changes the pressure differential at opposite ends of the tube for selectively driving the piston therebetween whereby the magnetic coupling between the piston and the platform causes the piston magnet to either "push" or "carry" the platform with its wafers between the work stations.

Provision of such a conveyance is relatively inexpensive and automates manufacturing without a significant increase in manufacturing costs by removing humans from the clean-room environment necessary to reduce the ambient contamination of wafers and achieve higher yields of acceptable wafers. Further, where lightweight products are to be transported, such as would be found in pharmaceuticals and other small components, the magnetic conveyor system in accord with this invention will find beneficial uses.

The foregoing and other advantages will become more apparent when viewed in light of the accompanying drawings and following detailed description wherein.

Figure 1:
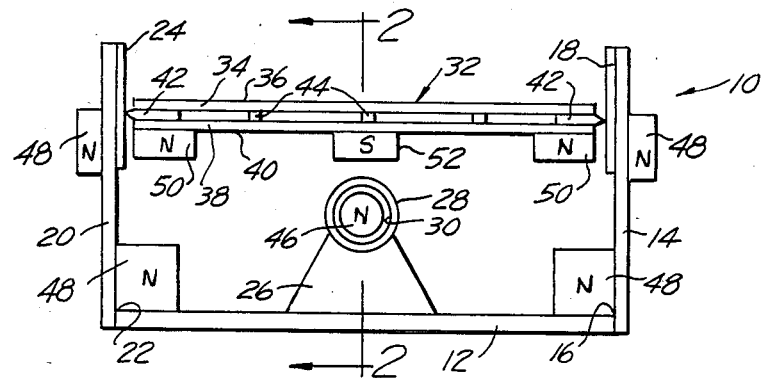
FIG. 1 shows an end view of conveyor system.

Turning now to the drawings, FIG. 1 shows a generally U-shaped rail 10 comprising a base (track) 12 having upstanding from opposite lateral edges thereof a pair of side walls 14, 20, a support bracket 26 extending upwardly from the base to support a cylindrical tube 28 having a piston 46 slidably disposed therein, and a platform 32 for transporting wafers is disposed above the tube. The rail, tube and platform are comprised of a nonmagnetic material, such as polyvinyl chloride or polypropylene. The tube and piston are generally cylindrical with the piston being slightly smaller in cross-section than the inner wall 30 of the bore defining the tube 20. The outer surface of the piston is coated with Teflon. The support bracket 26 is comprised of aluminum due to its nonferrous character, and polypropylene is used due to its durability and "cleanliness".

The sidewalls 14, 20 define a pair of corners 16, 22 at the base and a pair of interiorly facing surfaces each having a Teflon runner 18, 24 extending therealong. The Teflon runner is adapted to serve as a contamination free surface adjacent to the lateral edges of the platform.

The platform 32 is generally rectangular and has a top sheet 34 defining a planar upper surface 36, a bottom sheet 38 defining a bottom surface 40, interior braces 44 and a pair of beveled guides 42 of Teflon defining the lateral edges of the platform, the edges being generally coextensive with the Teflon runners 18, 24 extending inwardly from the sidewalls 14, 20. The Teflon-to-Teflon contact between the runners and the beveled guides is below the upper surface 36 (the wafer support surface) and provides a substantially contamination free contact between the surfaces.

A magnetic arrangement is provided for magnetically levitating the platform above the rail and magnetically coupling the platform to the piston whereby to direct wafers along a predetermined path between desired work stations. A first magnet 46 is disposed in the tube and defines the piston. Four rows of second magnets 48 are mounted on the rail one row extending along the base adjacent each interior corner 16, 22 and one row upperly from the base and extending along the outer surface of its associated sidewall. Two rows of third magnets 50 are disposed on the bottom surface 40 of the platform and adjacent the lateral edges. A row of fourth magnets 52 is disposed on the bottom surface of the platform between the third magnets and adjacent to the piston magnet 46.

The first, second and third magnets 46, 48, 50 have their magnetic polarity arranged to provide a magnetic field which repels one another thereby creating a magnetic cushion to levitate the platform relative to the track. The fourth magnet 52 is magnetically coupled to the piston magnet, either to be repelled by or attracted to the piston magnet depending on whether the piston magnet is to "push" or "carry" the platform. As shown, the fourth magnet 52 has its magnetic polarity arranged opposite to the polarity of the piston 46 whereby the magnetic couple therebetween is such that the platform is attracted to the piston and movement of the piston carries the platform. As shown the North poles (shown by "N") of the first, second and third magnets are adjacent to the South pole (shown by "S") of the fourth magnet. Each row of magnets is formed by butting like magnets together, each magnet being a ceramic magnet. The platform is supported on the apex of each magnetic flux envelope at the right and left sides of the track. If one pole of the fourth magnet 52 is positioned adjacent to a like pole of the piston magnet 46, the piston magnet will repel and push the platform.

While not shown, a drive arrangement is provided for changing the pressure differential at the opposite ends of the tube for selectively driving the piston therebetween whereby the platform will convey the wafers between the work stations. Further, the drive means comprises a plurality of solenoids which act on the drive means to selectively change the pressure differential acting on the piston, and control means connected to the drive means for detecting the acceleration and sending a signal to one or more of the solenoids whereby to pressurize and/or depressurize one end of the tube whereby to reduce or increase the acceleration of the piston or the desired direction of the piston relative to the tube.

Figure 2:
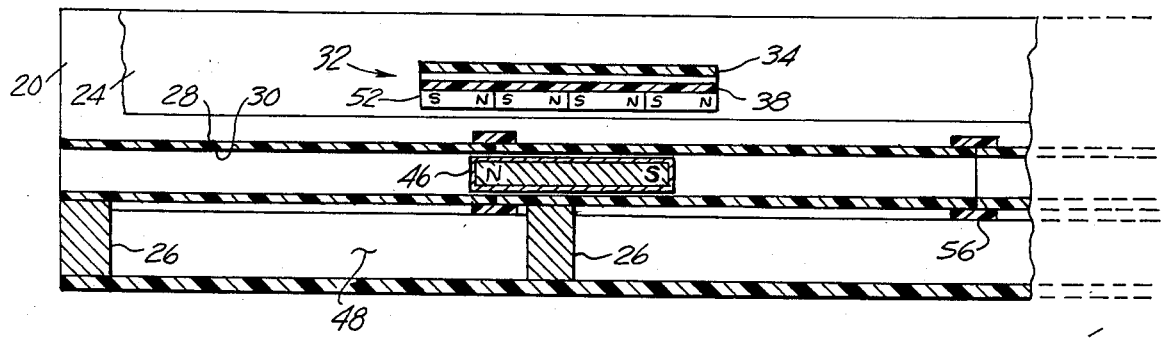
FIG. 2 shows a side view partially in section taken along lines II—II of FIG. 1.

FIG. 2 is a section view showing only a fragmentary portion of the conveyor system it being understood that the rail and tube are as long as needed to extend between work stations.

Figure 3:
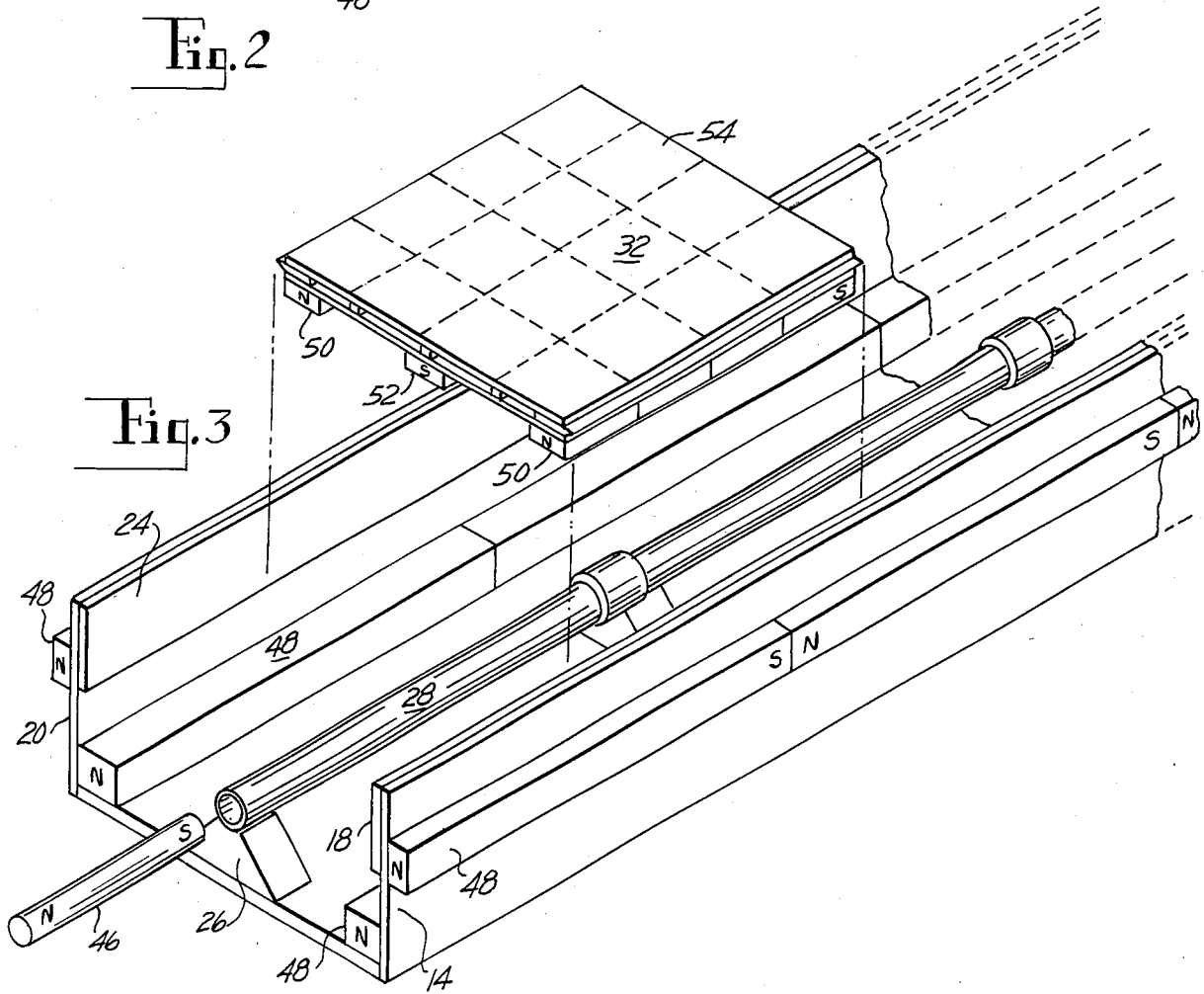
FIG. 3 shows a perspective view of the conveyor system.

FIG. 3 shows a perspective of the conveyor arrangement with the platform lifted upwardly from the rail to show details. The top surface of the platform is appropriately provided with a grid of criss-crossing ribs to define detents 54 for holding respective wafers to be transported. The tube has couplers 56 of like polymer provided as needed to extend the tube between the work stations.

In one representative configuration, a platform 32 approximately 8-inches square disposed between a rail having 4.5 inch high sidewalls and above a tube having a 1.125 inch bore diameter was sufficient a transport a load of about 5 pounds. The piston (driving magnet) 46 was Teflon-coated magnet approximately 5 inches in length and 0.985 inch outer diameter when coated. The second magnets 48 along the corner of the rail were magnets having a 1.0 inch square cross-section and on the sidewalls were magnets having a cross-section of approximately 1.0 inch by 0.395 inches. The third and fourth magnets 48, 50 adjacent the lateral edges and in the center of the platform were magnets having a cross-section of 1.0 inch by 0.50 inches. To form a row, either for the track or for the platform, the magnets are placed back to back to the desired lengths needed and secured by epoxy. The ceramic magnet is highly resistant to demagnetization, very lightweight and possesses a high energy potential. The magnets can demagnetize only if exposed to extreme temperatures (i.e., 150° or above) or if subjected to direct electrical current flow.

In the representative configuration, the magnets selected provided a suitable magnetic field to transport lightweight objects, such as those up to about 10–12 pounds. Depending on the application and the strength of magnets employed to create the magnetic cushion, the size and weight of the object(s) transported would differ.

I claim:

1. A conveyor system for transporting integrated circuit wafers on a platform to and from different work stations in a clean controlled environment, comprising:
    an elongated rail including a tube having opposite ends for directing the wafers along a predetermined path between said work stations, each said rail, tube and platform being comprised of a nonmagnetic material,
    first magnetic means connected to the rail and the platform for producing a piston magnet to magnetically repulse one another and thereby form a magnetic cushion levitating the platform above the rail,
    second magnetic means connected to said platform and centered with said piston magnet for magnetically coupling the platform to the tube,
    drive means for selectively driving the piston magnet in the tube between said ends whereby the platform transports wafers between the work stations;
    said first magnetic means comprising a first magnet on each lateral side of the platform, and a second magnet extending along each side of the rail each being adjacent to one respective first magnet, said second magnetic means including a third magnet medially of said first magnets and adjacent to the piston magnet,
    a runner extending along the interior surface of each sidewall adjacent to one lateral side of the platform, the lateral sides of the platform and each runner being of Teflon whereby to reduce contamination resulting from the platform contacting the runners, and
    said platform comprising a pair of longitudinal guide plates sandwiched between a pair of planar sheets, each guide plate extending outwardly from the sheets to define the lateral sides and terminating adjacent to its respective runner.

2. The conveyor system as recited in claim 1 wherein the lateral sides of said platform are substantially coextensive with the respective sidewalls forming the U-shape of the rail.

* * * * *